No. 775,941. PATENTED NOV. 29, 1904.
W. SIMKINS.
TRANSMISSION GEAR FOR AUTOMOBILES.
APPLICATION FILED MAY 16, 1904.
NO MODEL. 2 SHEETS—SHEET 2.

Witnesses: Inventor:
Thos. Durant Walter Simkins
Alexander S. Stewart Church & Church
his Attys No. 775,941.

Patented November 29, 1904.

UNITED STATES PATENT OFFICE.

WALTER SIMKINS, OF LONDON, ENGLAND.

TRANSMISSION-GEAR FOR AUTOMOBILES.

SPECIFICATION forming part of Letters Patent No. 775,941, dated November 29, 1904.

Application filed May 16, 1904. Serial No. 208,256. (No model.)

*To all whom it may concern:*

Be it known that I, WALTER SIMKINS, a subject of the King of England, residing at London, in England, have invented a certain new and useful Transmission-Gear for Automobiles, of which the following is a specification.

This invention relates to transmission-gear for automobiles, and has for its object to provide means whereby a chain or similar positive transmitter can be employed without the ill effects arising therefrom due to the transmitter being a positive one.

A positive transmitter employed in conjunction with an internal-combustion motor causes the road driving wheel or wheels to be subjected to excessive strains, with a result that the spokes give and the tire slips. If arrangements are made to prevent give in the spokes or slip in the tire, most of the strain is put upon the transmitter, causing it to break or stretch excessively. In most cases attempts are made to overcome these difficulties by mounting one of the sprocket-wheels upon a friction or spring clutch; but other devices have been employed. However, in most cases the fitting of such devices has been costly, owing to the fact that the rear wheel has in most cases had to be rebuilt. In other cases the transmission has not been satisfactory.

The object of this invention is to provide a means readily attachable to most existing machines, whereby a certain amount of slip may be permitted between a member driven positively from the engine and an integral part of the road-wheel, such as a belt-pulley attached thereto. In some cases when the device is being fitted to a new machine or when it is desired to obtain the best possible results a means for adjusting the tension of the positive transmitter can be fitted.

A further object of this invention is to provide a simple device for carrying this out in conjunction with the transmission-gear constructed according to this invention.

The accompanying drawings illustrate how this invention is carried into effect on a motor-cycle.

Figure 1:
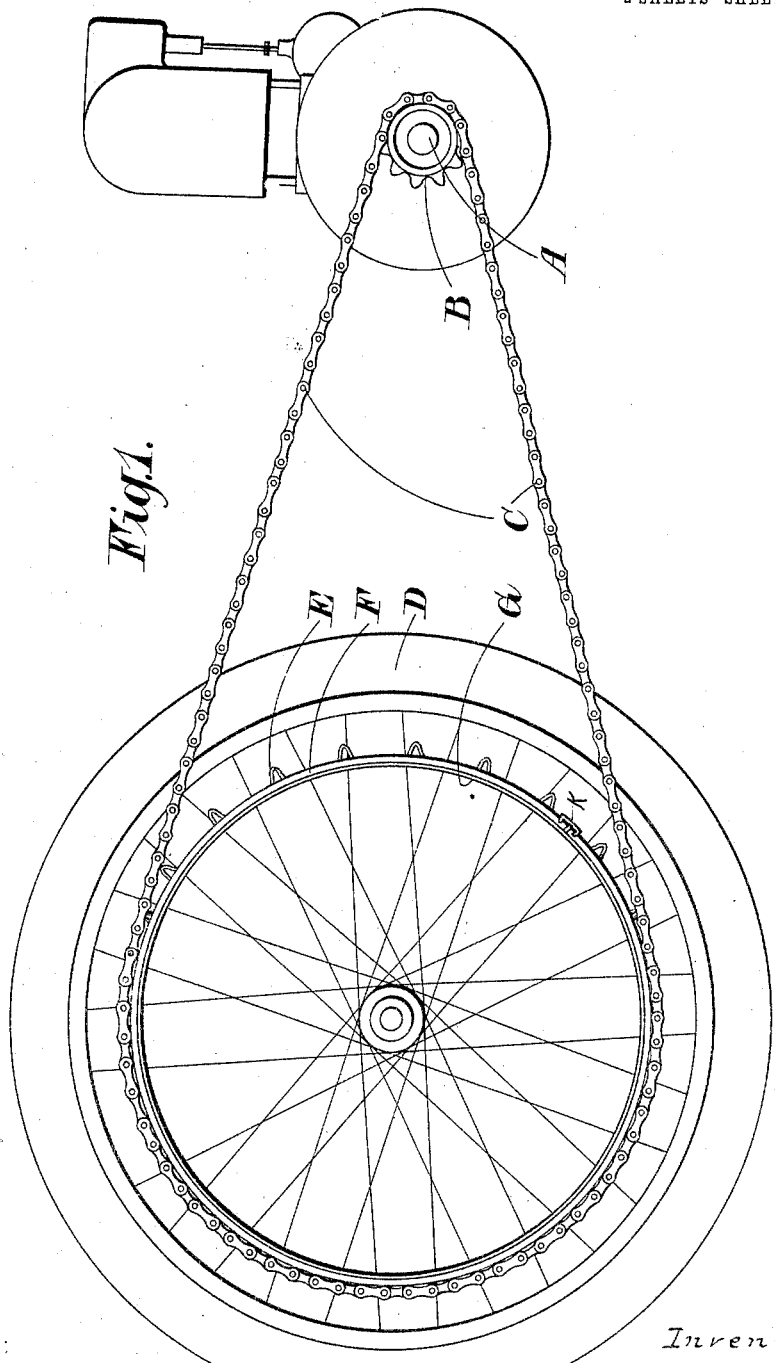
Figure 2:
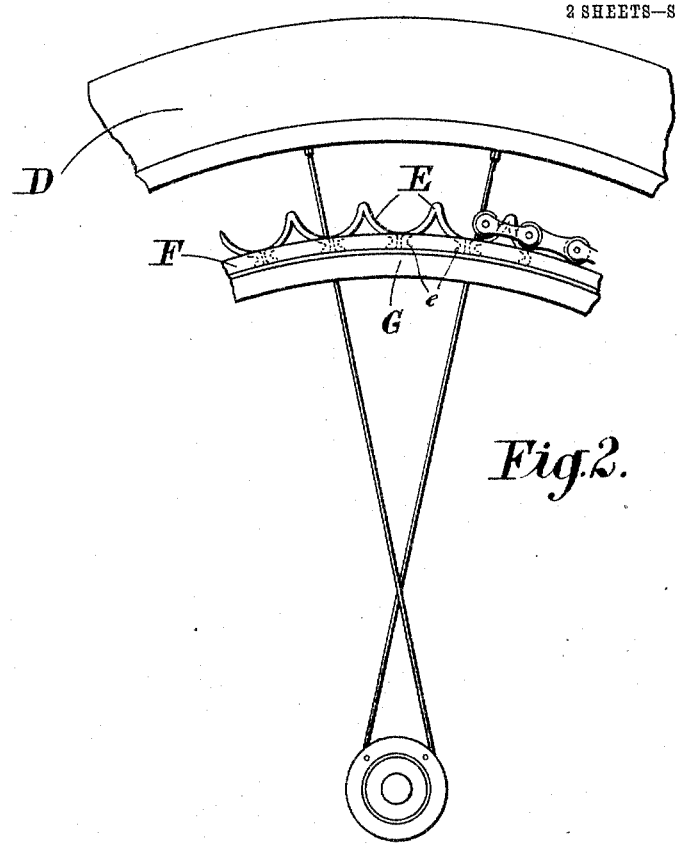
Figure 3:
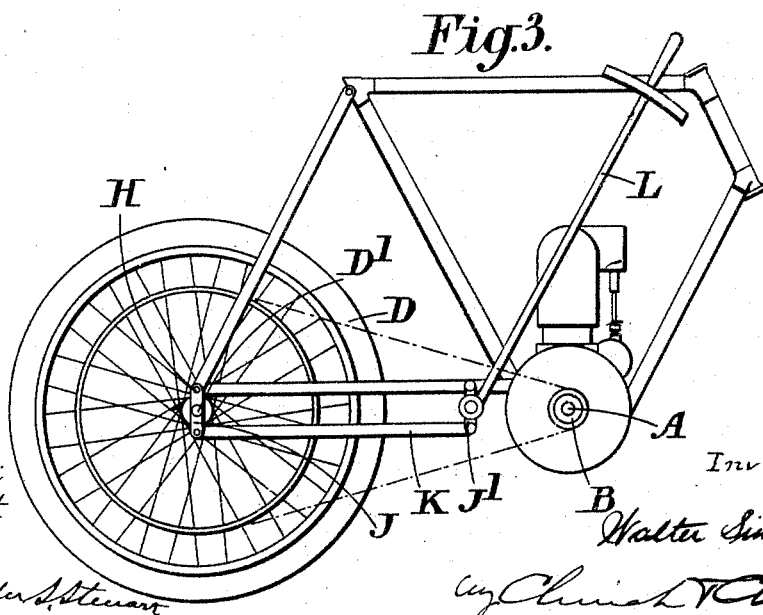

Figure 1 is a side elevation showing the transmission-gear, parts which would complicate the drawing being omitted for the sake of clearness. Fig. 2 is a similar view of part of the same on an enlarged scale. Fig. 3 shows diagrammatically how the tension of the transmitter is adjusted.

The engine-shaft A has keyed upon it a chain-sprocket B, and the road driving-wheel D has attached to it a belt-pulley G. A slightly-yielding pitch-band F, of leather, canvas, or the like, is passed round the belt-pulley and has its ends joined by any suitable belt-fastening $k$, Fig. 1. The band F is provided with suitable chain-teeth, of any suitable metal, provided with prongs or sharpened projections $e$, which are driven through the band F and turned down on the inner side thereof, as shown clearly in Fig. 2. A chain C engages these teeth and those on the driving-sprocket B. Instead of teeth depressions may be formed on the band, with which projections on a suitable chain may be caused to engage.

The road-wheel spindle D' is not carried in the rear fork ends H, as usual, but is carried by links J, pivoted to the rear fork ends. The free ends of these links are coupled by parallel members K to other links J', pivoted on the chain-stays. A lever L is attached to these second links J', the free end of which is brought within reach of the rider. The pedaling-gear, when used, may be carried on these links, so as to be unaffected by the tensioning of the motor-chain.

In operation the engine transmits its power positively from the sprocket B to the band F by way of the chain C. At starting or when the engine impulses are heavy sufficient slip takes place between the band F and the pulley G, attached to the road-wheel, to prevent the road-wheel and tire from being strained excessively; but sufficient power is transmitted to drive the cycle. Should the slip be excessive or the reverse, the tension of the chain can be adjusted by swinging the road-wheel center farther from or nearer to the engine by means of the hand-lever L without affecting the tension of the pedaling-chain when used. When running slowly, more slip is required than when running fast, so that it is desirable to use a method of adjustment such as that described in conjunction with this gear.

It will be seen that in this gear the friction members, the band F, and pulley G contact for nearly the whole circumference, so that a much smoother and steadier transmission is produced than is the case where the friction-surfaces contact only for a small part of the circumference. Further, this gear is quiet in action and can be adapted to most existing motor-cycles or light cars having side driving-chains without much alteration.

A further feature of the transmission-gear is that as the pitch-band is slightly extensible the pitch of the teeth thereon adjusts itself automatically to the pitch of the chain, which owing to wear and stretching is not constant.

Obviously the rim of the pulley G need not be flat, but can be of V or other suitable shape, if desired.

What I claim as my invention, and desire to secure by Letters Patent, is—

1. In combination, a drive-shaft, a chain-sprocket attached thereto, a road driving-wheel, a pulley attached to said driving-wheel, a ring of teeth adapted to slip slightly on said pulley and a chain transmitting the power from the sprocket on said drive-shaft to the teeth on said pulley, substantially as set forth.

2. In combination, a drive-shaft, a chain-sprocket attached thereto, a road driving-wheel, a pulley attached to said driving-wheel, a pitch-band embracing said pulley adapted to slip thereon under strain, and a chain transmitting the power from the sprocket on said drive-shaft to the pitch-band, substantially as set forth.

3. In combination, a drive-shaft, a chain-sprocket attached thereto, a road driving-wheel, a belt-pulley attached to said driving-wheel, a toothed band embracing said pulley adapted to slip slightly thereon, a chain transmitting the power from the sprocket on said drive-shaft to the teeth on said band, means for adjusting the tension of the chain, substantially as set forth.

4. In combination, a drive-shaft, a chain-sprocket attached thereto, a road driving-wheel, a belt-pulley attached to said driving-wheel, a toothed band embracing said belt-pulley and adapted to slip thereon, a chain transmitting the power from the sprocket on said drive-shaft to the teeth on said band, links pivoted to rear fork ends and carrying driving-wheel spindle and a lever attached to said links and adapted to move said links, substantially as set forth.

5. In combination, a drive-shaft, a chain-sprocket attached thereto, a road driving-wheel, a belt-pulley attached to said driving-wheel, a toothed band embracing said belt-pulley and adapted to slip thereon, a chain transmitting the power from the sprocket on said drive-shaft to the teeth on said band, links pivoted to rear fork ends and carrying driving-wheel spindle, connections from said links to second links, and a lever attached to said second links and brought within reach of the rider, substantially as set forth.

6. In combination, a drive-shaft, a chain-sprocket attached thereto, a driving-wheel, a pulley attached to said driving-wheel, a yielding pitch-band embracing said pulley and adapted to slip thereon, and a chain transmitting the power from the sprocket on the drive-shaft to the pitch-band; substantially as described.

In testimony whereof I have signed my name to this specification in the presence of two subscribing witnesses.

WALTER SIMKINS.

Witnesses:
H. D. JAMESON,
A. NUTTING.